(12) United States Patent
Jeon et al.

(10) Patent No.: US 6,354,707 B1
(45) Date of Patent: Mar. 12, 2002

(54) LIQUID CRYSTAL DISPLAY PROJECTION SYSTEM

(75) Inventors: Kee-uk Jeon, Suwon; Dae-je Chin, Seoul, both of (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 50 days.

(21) Appl. No.: 09/589,070

(22) Filed: Jun. 8, 2000

(30) Foreign Application Priority Data

Jun. 11, 1999 (KR) .............................. 99-21750

(51) Int. Cl.[7] .............................. G03B 21/14
(52) U.S. Cl. .............................. 353/69
(58) Field of Search .............................. 353/69, 122, 31, 353/34, 37; 349/5, 58, 75, 122, 155, 156, 157

(56) References Cited

U.S. PATENT DOCUMENTS

| | | | |
|---|---|---|---|
| 5,369,450 A | 11/1994 | Haseltine et al. | 348/745 |
| 5,682,212 A * | 10/1997 | Maurer et al. | 349/5 |
| 5,758,941 A * | 6/1998 | Stahl | 353/69 |
| 5,868,481 A | 2/1999 | Conner et al. | 353/38 |
| 6,030,082 A * | 2/2000 | Yamamoto | 353/38 |
| 6,122,032 A * | 9/2000 | Mihara et al. | 349/155 |

FOREIGN PATENT DOCUMENTS

WO 91/15800 10/1991 ......... G02F/1/1333

* cited by examiner

Primary Examiner—William Dowling
(74) Attorney, Agent, or Firm—Sughrue Mion, PLLC

(57) ABSTRACT

An LCD device has a distorted and/or curved shape corresponding to an image formed on the screen before correcting for distortion and/or curvature of the image formed on the screen, which are generated due to distortion aberration and/or curvature aberration of the projection lens unit, so that distortion and/or curvature can be corrected. The LCD device has a pin-cushion type structure distorted and curved positively (+) so that negative (-) distortion and curvature of the image formed on the screen, which is generated due to distortion aberration and curvature aberration of the projection lens unit, can be corrected. Also, the LCD device includes a front substrate and a rear substrate, each having electrodes formed thereon, and the front substrate and/or the rear substrate have a pin-cushion shape distorted and/or curved positively (+). Thus, distortion aberration and/or curvature aberration of optical lenses of a projection lens unit can be corrected by appropriately correcting a light emitting point of image light.

16 Claims, 17 Drawing Sheets

LIQUID CRYSTAL DISPLAY PROJECTION SYSTEM

BACKGROUND OF THE INVENTION

1. Field of the Invention

The present invention relates to a liquid crystal display (LCD) projection system and, more particularly, to an LCD projection system in which an image formed on a screen with curvilinear distortion and/or field curvature due to distortion aberration and curvature aberration generated in an optical system of a projection lens unit is corrected.

2. Description of the Related Art

An LCD projection system, which is one type of image projection system for displaying an image, generates an image using an LCD as an image generating means, and magnifies and projects the generated image onto a screen via a projection lens unit. The LCD projection system makes it easy to adjust the size of a screen and exhibits superior color reproducibility so that it is widely used as a large (over 40 inches) multimedia display device for HDTVs or video conferences.

LCDs are divided into a dispersion type such as a polymer dispersed liquid crystal (PDLC), and a polarization type such as twisted nematic (TN), according to a liquid crystal mode, and into a transmission type and a reflection type according to a transmission mode or a reflection mode of a light beam forming an image. Also, an LCD projection system is divided into a one panel type and a three panel type according to the number of LCD panels.

Referring to FIG. 1, a conventional one panel reflection type LCD projection system includes a light source 110 for generating and emitting light, a glass rod 130 for mixing incident light emitted from the light source 110 to emit light having a uniform intensity profile, a focusing lens 131, a collimating lens 132, a polarization beam splitter 140 for altering the optical path of incident light by transmitting or reflecting the incident light according to its polarization component, an LCD device 150 for generating an image by selectively reflecting incident light, and a projection lens unit 160 for magnifying and projecting incident light onto a screen S.

The light source 110 consists of a lamp 111 for generating light and a reflection mirror 112 such as a parabolic mirror or an elliptical mirror for reflecting the light emitted from the lamp 111 and guiding the reflected light along a predetermined proceeding path.

Reference numeral 120 denotes a color wheel which is rotatably installed on the proceeding path of light emitted from the light source 110. The color wheel 120 has red (R), green (G) and blue (B) color filters equally arranged on the surface thereof so that light of a particular color of the light emitted from the light source 110 is selectively transmitted.

The glass rod 130 mixes incident light by irregularly reflecting the light to emit light having a uniform intensity profile. The focusing lens 131 focuses and diverges the light passing through the glass rod 130 to enlarge the transmission width of the light. The collimating lens 132 collimates the diverging incident light to make a parallel beam.

The polarization beam splitter 140 is arranged on the optical path between the collimating lens 132 and the LCD device 150. The polarization beam splitter 140 alters the proceeding path of incident light by transmitting or reflecting the incident light by a mirror surface 141 according to its polarization component (P polarization or S polarization). The light passing through the polarization beam splitter 140 is incident upon the LCD device 150 and reflected by the LCD device 150 with the polarization direction being rotated by 90°. The light reflected by the LCD device 150 is incident upon the polarization beam splitter 140 again and totally reflected by the mirror surface 141. The totally reflected light passes through the projection lens unit 160 and is magnified and projected onto the screen S.

FIG. 2 shows an optical structure of a conventional one panel transmission type LCD projection system. Referring to the drawing, a transmission type LCD device 250 is arranged on the proceeding path of light. The LCD device 250 generates an image by selectively driving individual pixels to determine transmission of the light emitted from a light source 210. Reference numerals L1, L2 and L3 denote optical lenses for forming a parallel light beam. Reference numeral M denotes a reflection mirror for altering the proceeding path of light so that the light proceeds toward a projection lens unit 260 and a screen S.

In the above LCD projection systems, optical aberration is usually generated when an image is formed on the screen S via the projection lens unit (160 or 260). That is, optical aberration such as curvilinear distortion or field curvature is generated.

As is well known, the distortion is generated by lens aberration, which refers to the focal distance at points near the optical axis and far from the optical axis being different. That is, with respect to an ideal state where no distortion is generated, such as an image surface 31 as shown in FIG. 3A, a positive (+) distortion image 32 (pin-cushion distortion), having concave sides as shown in FIG. 3B, or a negative (−) distortion image 33 (barrel distortion), having convex sides as shown in FIG. 3C are generated.

The positive (+) distortion image 32, as shown in FIG. 3D, means that a square image generated by the flat type LCD device 150 (250) is distorted to positive (+) due to aberration of a lens 160a (260a) and formed on the screen S by being distorted in a pin-cushion shape. The negative (−) distortion image 33, as shown in FIG. 3E, means that a square image generated by the flat type LCD device 150 (250) is distorted to negative (−) due to aberration of a lens 160b (260b) and formed on the screen S by being distorted in a barrel shape.

The above-mentioned curvature distortion is caused by lens aberration which forms an image to focus on a curved (concave or convex) surface with respect to a flat screen S, as shown in FIG. 4. Due to the curvature distortion, a flat image generated by the flat type LCD device 150 (250) is formed as an image 34 in a state of field curvature.

FIG. 4 shows a case in which the surface of the image formed on the screen S is concave due to lens aberration. Although not shown in the drawing, the surface of the image may be formed on the screen S to be convex due to lens aberration. The curvature mentioned below includes both the concave and convex states.

In the conventional LCD projection system, the distortion and curvature are generated in combination in an actual projection lens unit optical system to make an image light having a plane shape generated by the flat type LCD device 150 (250) to be an image having the sides curved and simultaneously the surface curved (concave or convex). Finally, the image becomes a complexly distorted image.

Also, the projection lens unit 160 (260) generates chromatism according to the wavelength of incident light. Due to chromatism, a red ray, of which the wavelength is relatively longer than other rays incident in parallel on an optical lens (convex lens) of the projection lens unit 160 (260) is focused at a point beyond the focal distance of the optical lens (convex lens). A blue ray, of which the wavelength is relatively shorter than other rays incident in parallel on an optical lens (convex lens) of the projection lens unit 160 (260), is focused at a point located closer than the focal distance of the optical lens (convex lens). Thus, the red, green and blue color images formed by the LCD device are not formed to be the same size on the screen. In this case, differences in the magnification power of red, green and blue color images are generated so that mismatch among the red, green and blue color images gradually increases from the center to the periphery of the screen, lowering the quality of the image.

Thus, in the LCD projection system, the projection lens unit 160 (260) needs an optical configuration designed to perform an optimal correction considering both chromatism and optical lens aberration such as distortion aberration and curvature aberration. However, it not difficult to perfectly correct chromatism and distortion aberration and curvature aberration because of properties of an optical lens.

Practically, various types of optical lenses are added to or excluded from the projection lens unit for correction of the chromatism and distortion aberration and curvature aberration, so that the projection lens unit is designed and manufactured in the state in which the chromatism and distortion aberration and curvature aberration are appropriately corrected. However, the above correction method has limits according to specifications of the projection lens unit, a complex optical configuration and aberration of other optical lenses.

SUMMARY OF THE INVENTION

To solve the above problems, it is an objective of the present invention to provide an LCD projection system which can correct an image formed to be distorted and/or curved on a screen due to distortion aberration and/or curvature aberration of optical lenses of a projection lens unit.

Accordingly, to achieve the above objective, there is provided an LCD projection system including a light source for generating and emitting light, an LCD device for generating image light using incident light emitted from the light source, and a projection lens unit for magnifying and projecting the image light emitted from the LCD device onto a screen, in which the LCD device has a distorted and/or curved shape corresponding to an image formed on the screen before correcting for distortion and/or curvature of the image formed on the screen, which are generated due to distortion aberration and/or curvature aberration of the projection lens unit, so that distortion and/or curvature can be corrected.

BRIEF DESCRIPTION OF THE DRAWINGS

The above objective and advantages of the present invention will become more apparent by describing in detail a preferred embodiment thereof with reference to the attached drawings, in which.

DETAILED DESCRIPTION OF THE INVENTION

Figure 5:
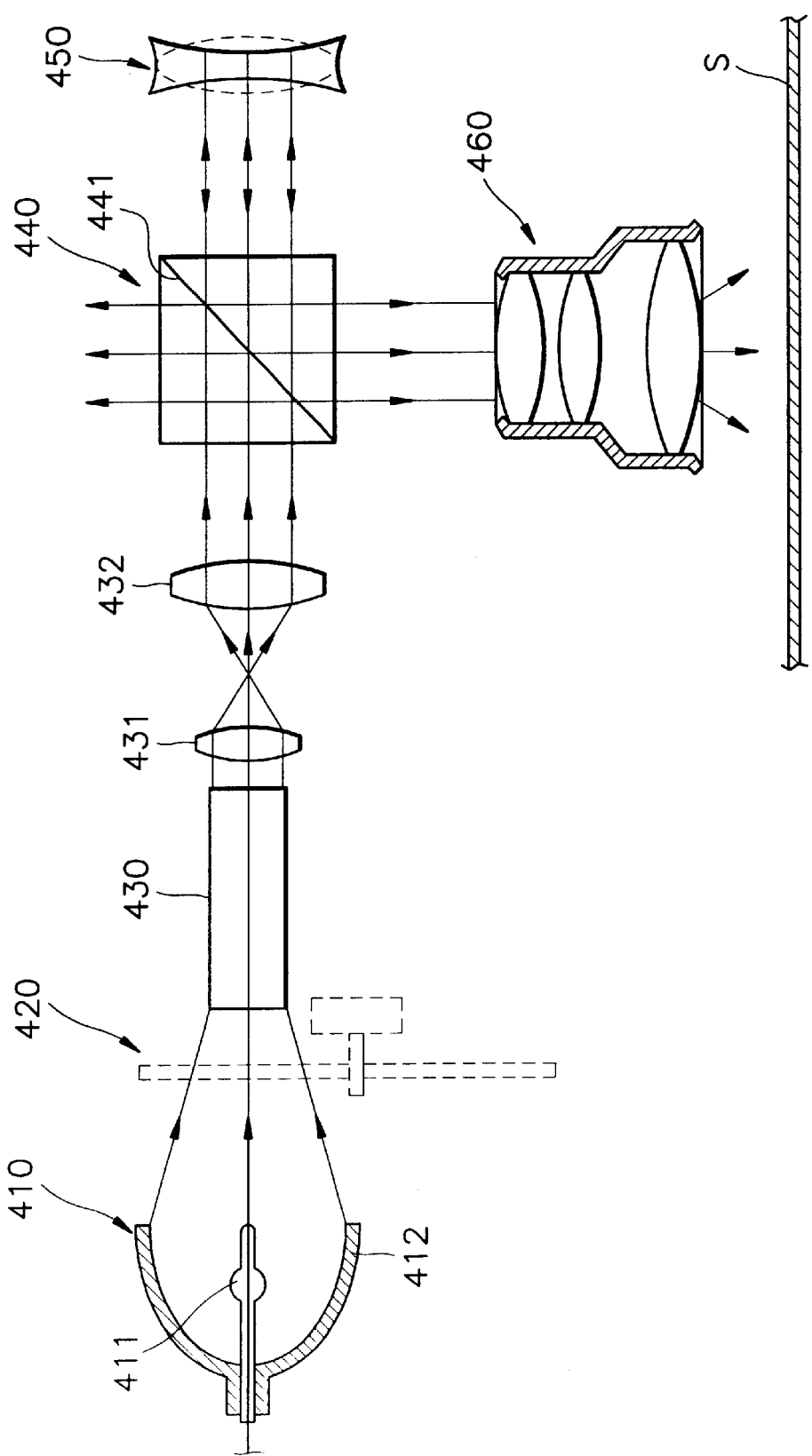
FIG. 5 is a view schematically showing the optical configuration of an LCD projection system according to the present invention.

Referring to FIG. 5, a reflection type LCD projection system according to the present invention includes a light source 410 for generating and emitting light, a glass rod 430 for mixing incident light emitted from the light source 410 to emit light beams having a uniform intensity profile, a focusing lens 431 and a collimating lens 432, a polarization beam splitter 440 for altering the optical path of incident light by transmitting or reflecting the incident light according to the polarization of the light, an LCD device 450 for generating an image by selectively reflecting incident light, and a projection lens unit 460 for magnifying incident light and projecting the magnified light onto a screen S. Reference numerals 411, 412 and 420 denote a lamp, a reflection mirror and a color wheel, respectively.

Figure 1:
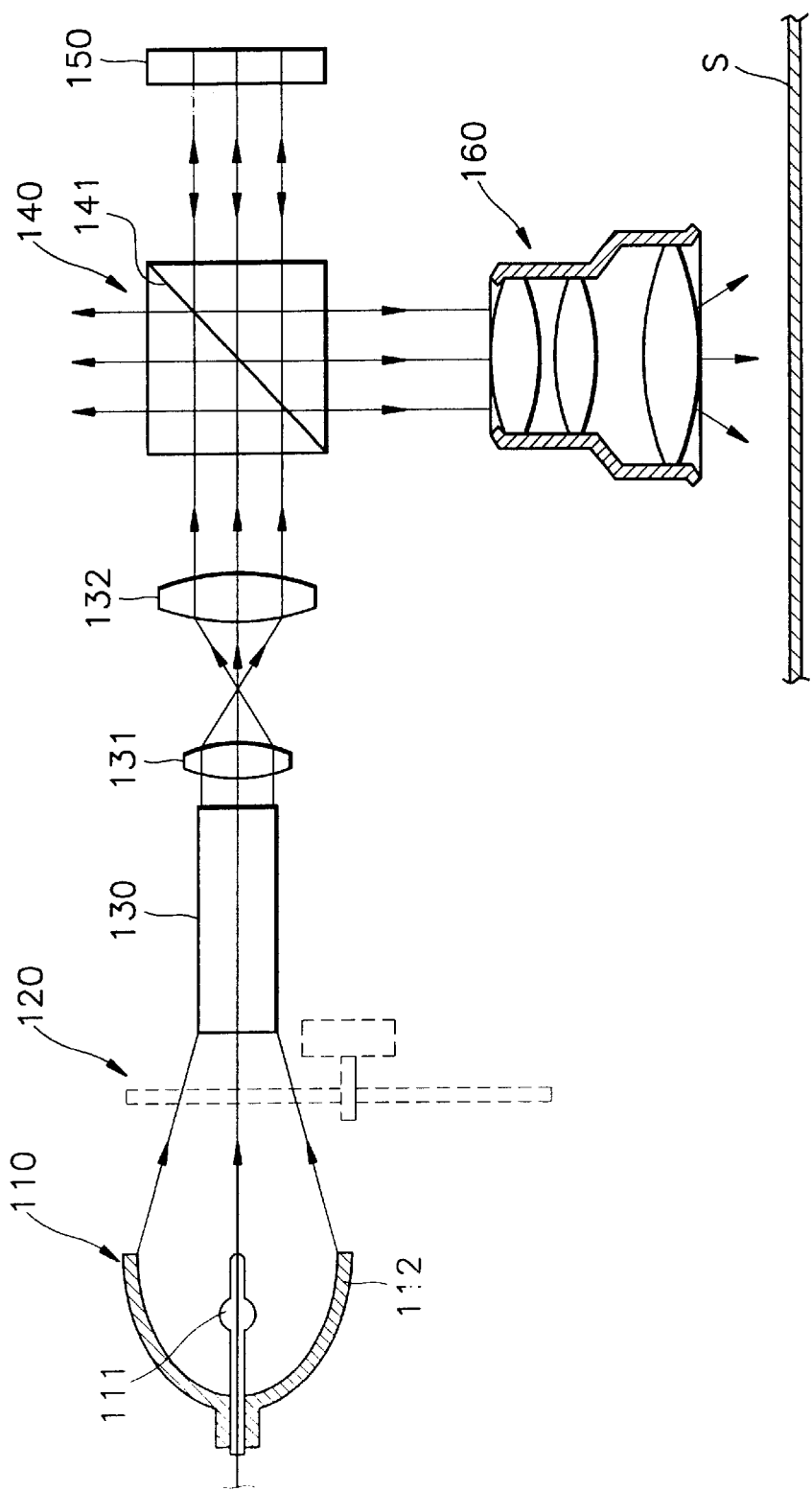
FIG. 1 is a view schematically showing the optical configuration of a conventional reflection type LCD projection system.
Figure 2:
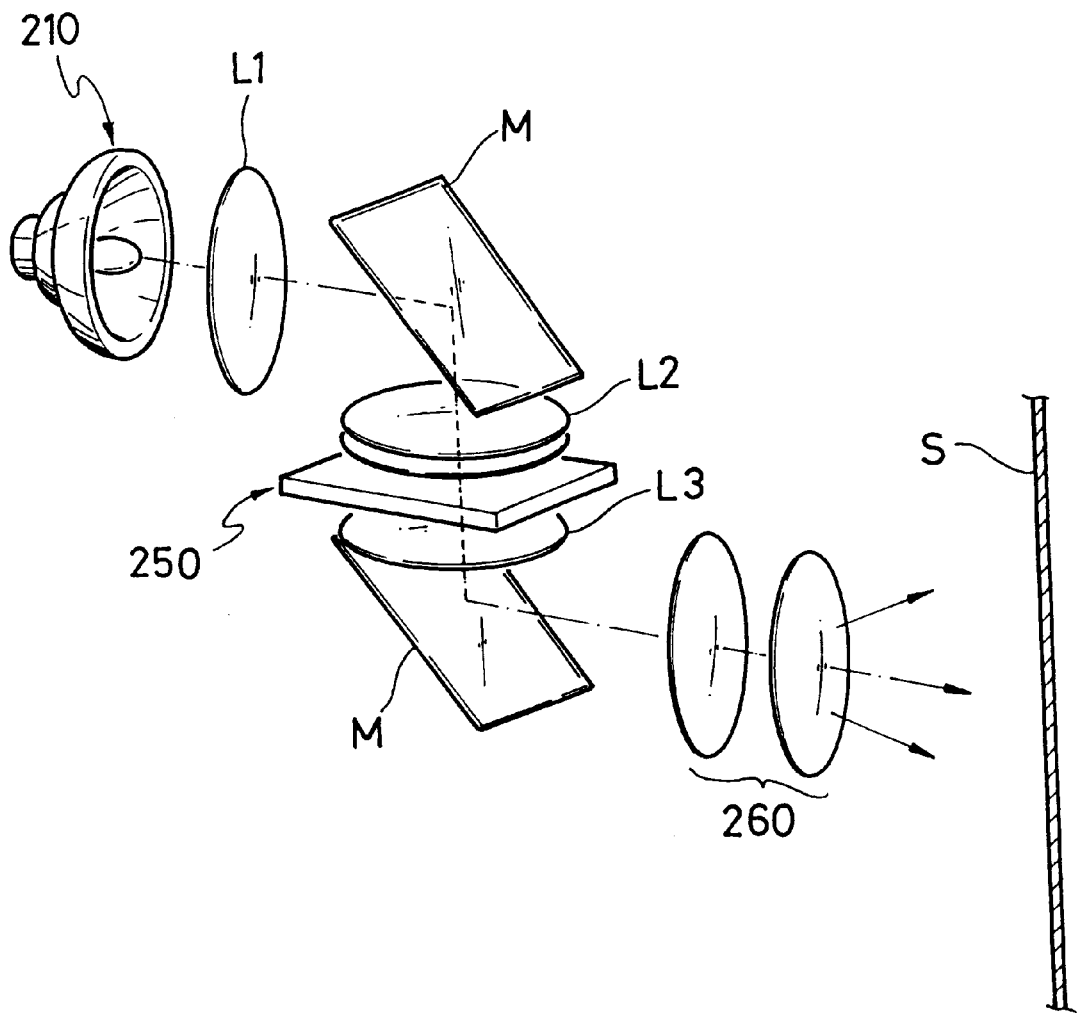
FIG. 2 is a perspective view schematically showing the optical configuration of a conventional transmission type LCD projection system.
Figure 3A:
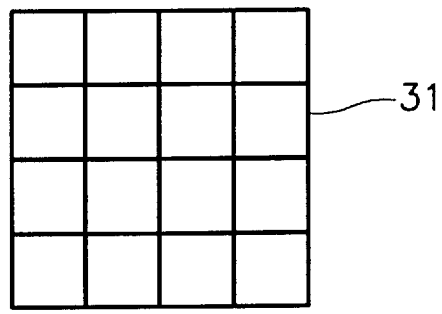
FIGS. 3A through 3E are views for explaining the formed images due to distortion aberration of the projection lens unit of the conventional LCD projection system.
Figure 3B:
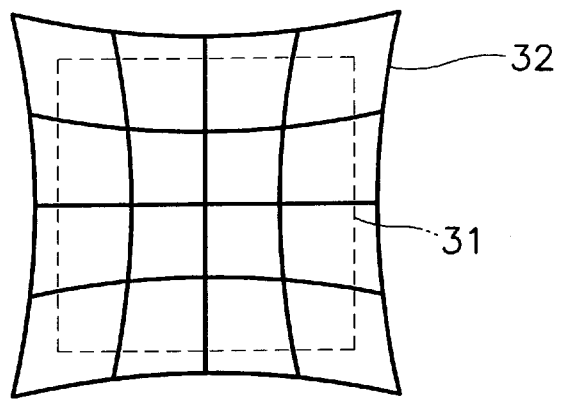
Figure 3C:
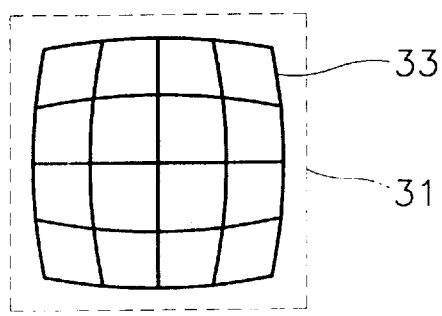
Figure 3D:
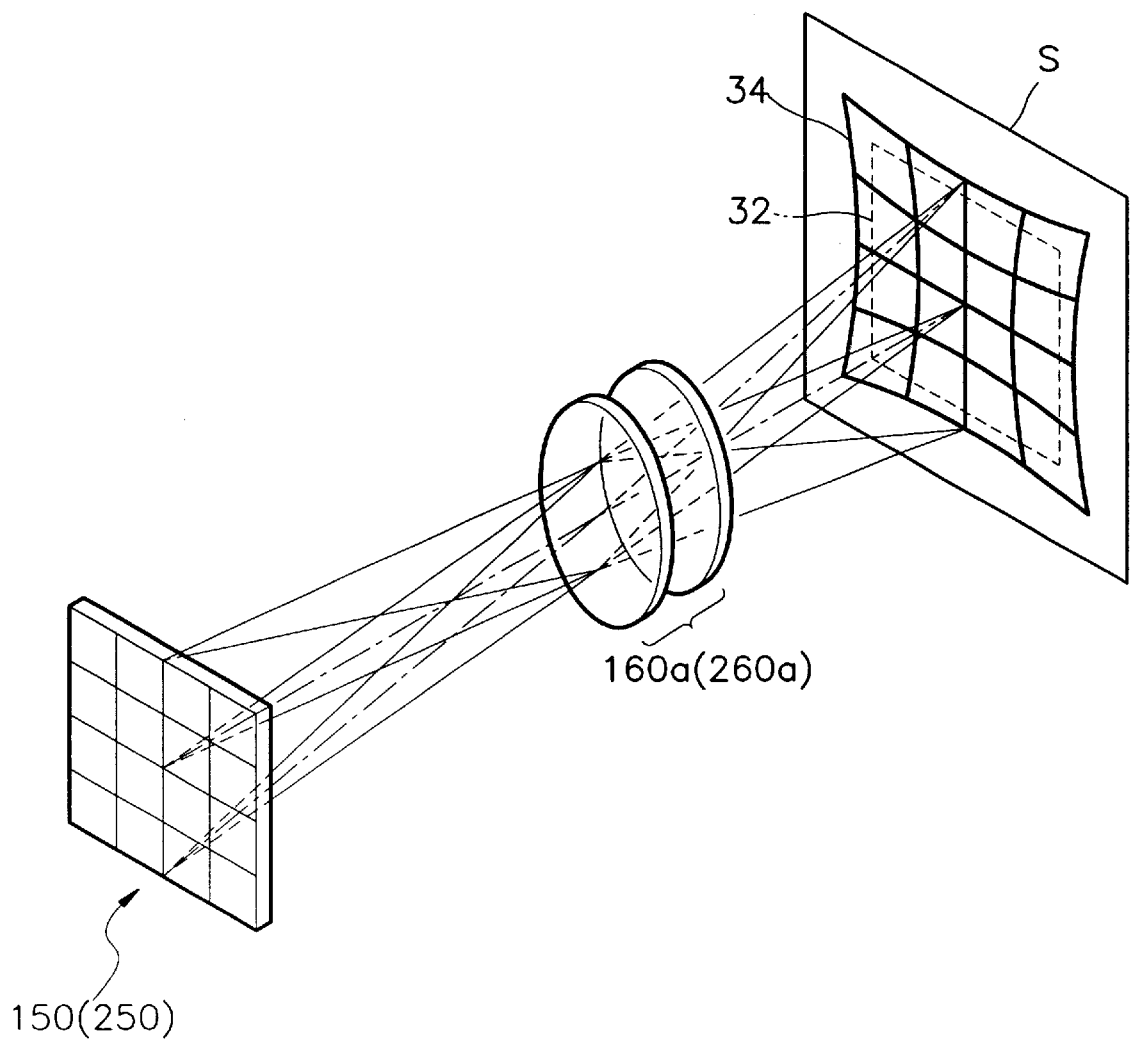
Figure 3E:
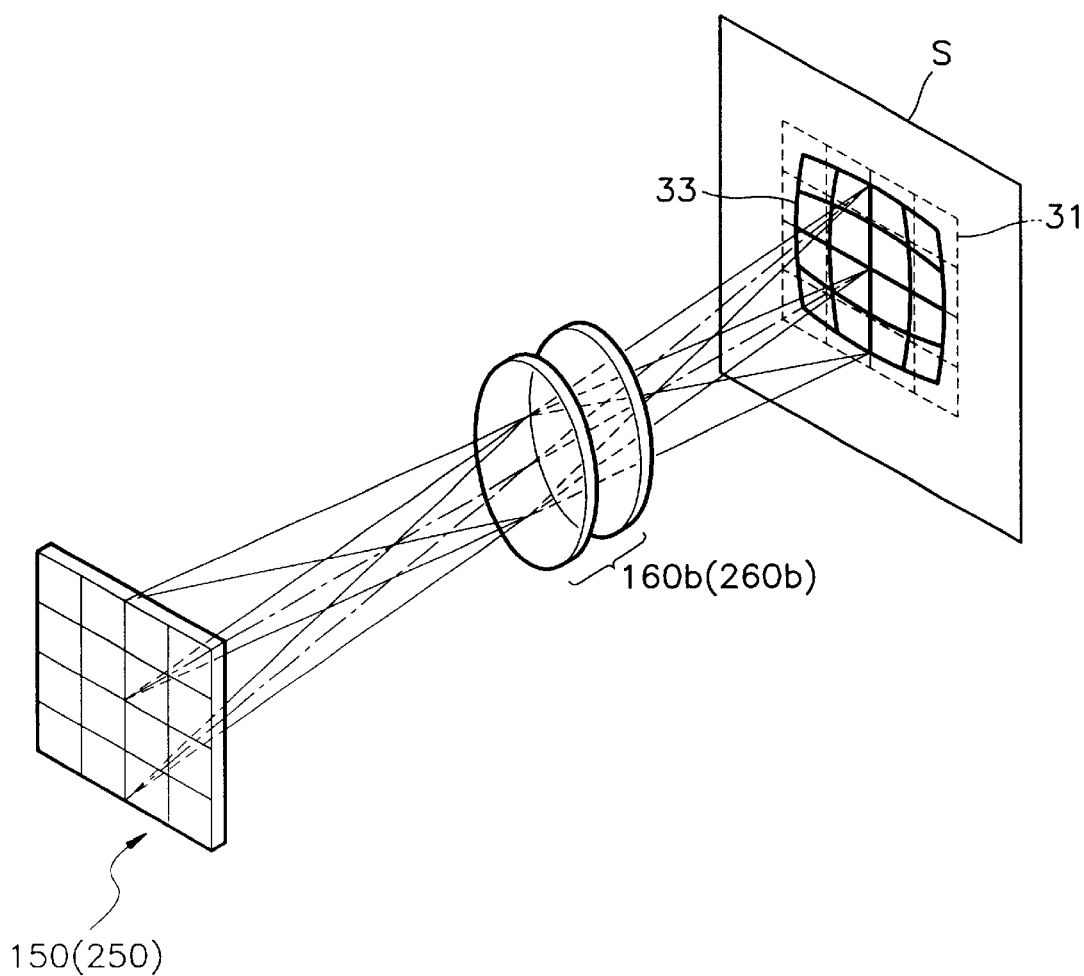

In the above optical configuration, the LCD device 450 is a characteristic feature of the present invention. According to one aspect of the present invention, the LCD device 450 has a shape deformed opposite to a distorted image formed on the screen S before correction, so that the distorted image formed on the screen S due to curvilinear distortion of the projection lens unit 460 can be corrected. That is, the LCD device 450 has a shape which may be a pin-cushion shape as shown in FIG. 3B, or a barrel shape as shown in FIG. 3E, according to the shape of the curvilinear distortion of the image formed on the screen S.

Figure 4:
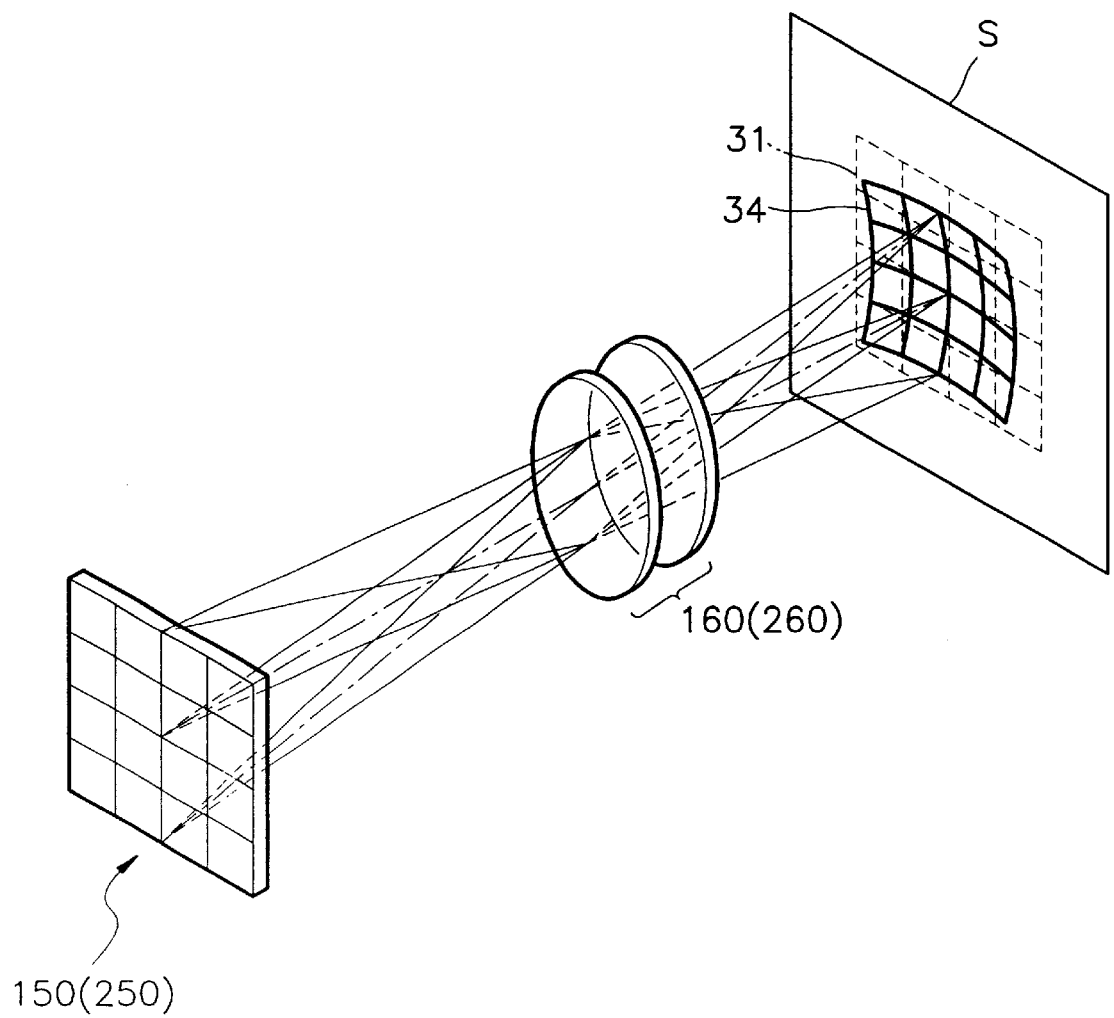
FIG. 4 is a perspective view for explaining the image forming state due to curvature aberration of the projection lens unit of the conventional LCD projection system.

According to another aspect of the present invention, it is a characteristic feature of the present invention that the LCD device 450 has a shape deformed opposite to an image 34 which is distorted due to curvature aberration and formed on the screen S before correction, as shown in FIG. 4, so that the image with field curvature formed on the screen S generated by the projection lens unit 460 can be corrected.

According to yet another aspect of the present invention, it is a characteristic feature of the present invention that the LCD device 450 has a distorted and curved shape opposite to an image formed on the screen S in a state of being affected by distortion and field curvature, to correct the image formed on the screen having a distorted image of a pin-cushion shape or a barrel shape due to distortion aberration and curvature aberration of the projection lens unit 460 and simultaneously the image with curvilinear distortion deformed by being affected by field curvature (concave or convex).

Figure 6A:
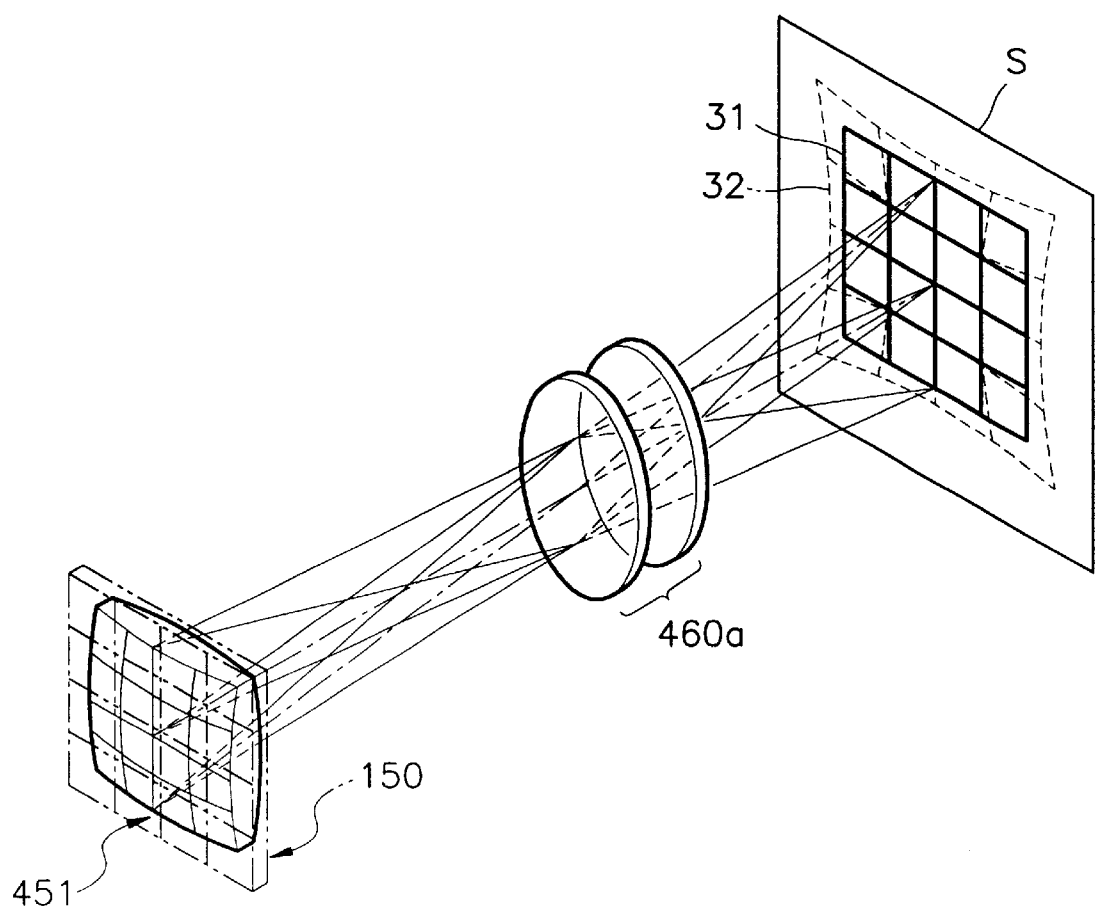
FIGS. 6A through 6D are views showing an LCD projection system according to a preferred embodiment of the present invention to correct distortion aberration and positive (+) curvature aberration of the conventional LCD projection system shown in FIGS. 3B and 3D.

In the shape and operation of the LCD device 450 of the present invention, FIG. 6A shows a preferred embodiment for correcting complex distortion and curvature of an image formed to be a pin-cushion type distortion image 32 due to distortion aberration, and simultaneously formed to be curved due to curvature aberration.

According to this embodiment, the LCD device 451 is distorted to be negative (−) with respect to the ordinary flat panel type LCD device 150, and simultaneously has a convex shape in a direction of the optical axis. Accordingly, the image generated by the LCD device 451 is an image being inversely distorted and curved. Accordingly, when an image generated by the LCD device 451 passes through the rojection lens unit 460a, distortion aberration is corrected in negative (−) direction and simultaneously in a direction corresponding to the direction that the image is curved. Thus, an almost undistorted image 31 is formed on the screen S.

The above operation is possible by altering the shape of the LCD projection device 451 to correct the focal distance and power of a lens in the direction of negative (−) at a point off the optical axis of the distorted image 32, formed to be positive (+) on the screen S by the flat panel type LCD device 150 before lens aberration correction.

Figure 6B:
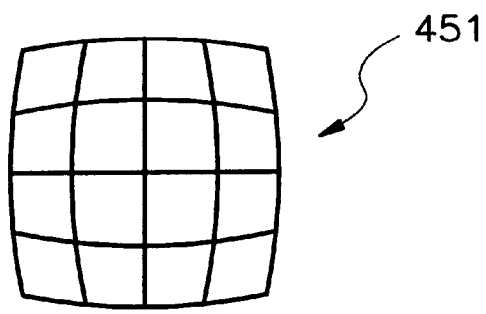
Figure 6C:
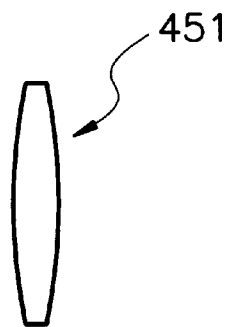
Figure 6D:
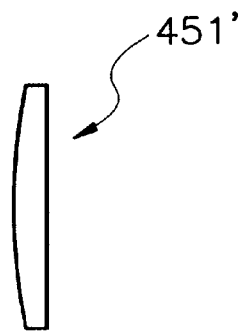

FIG. 6B is a front view and FIG. 6C is a side view of the LCD device 451 having a complexly negative (−) distorted and curved shape. FIG. 6D is a side view of a modified preferred embodiment of an LCD device 451' having a shape in which only the light emitting surface thereof is distorted and curved.

Figure 7A:
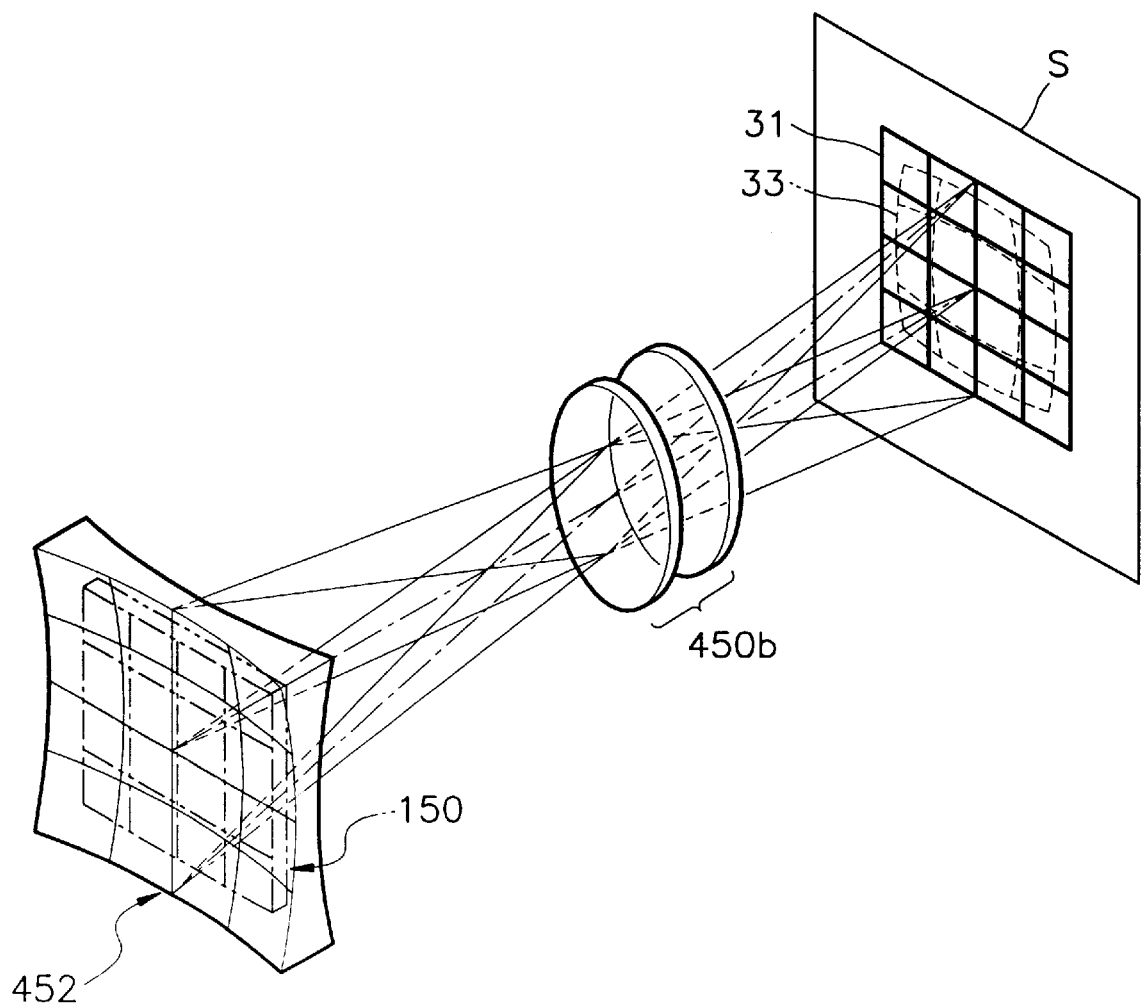
FIGS. 7A through 7D are views showing an LCD projection system according to a preferred embodiment of the present invention to correct distortion aberration and negative (−) curvature aberration of the conventional LCD projection system shown in FIGS. 3C and 3E.

FIG. 7A shows a preferred embodiment of an LCD device to correct complex distortion and curvature of an image formed to be a barrel type distorted image 33 due to the distortion aberration described with reference to FIGS. 3C and 3E and simultaneously formed to be distorted due to the curvature aberration described with reference to FIG. 4. According to this embodiment, when an image generated by the LCD device 452 passes through the projection lens unit 450b, distortion aberration is corrected in the positive (+) direction and simultaneously in a direction corresponding to the direction that the image is curved, so that an almost undistorted image 31 is formed on the screen S.

The above operation is possible by altering the shape of the LCD projection device 452 to correct the focal distance and power of a lens in the direction of positive (+) at a point off the optical axis of the distorted image 33, formed to be distorted in a direction of negative (−) on the screen S by the flat panel type LCD device 150 before lens aberration correction.

Figure 7B:
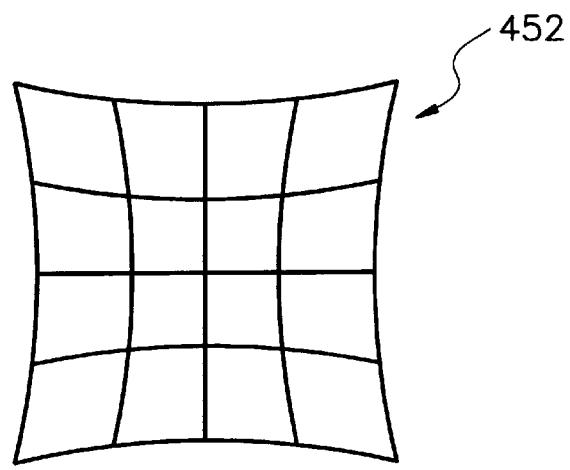
Figure 7C:
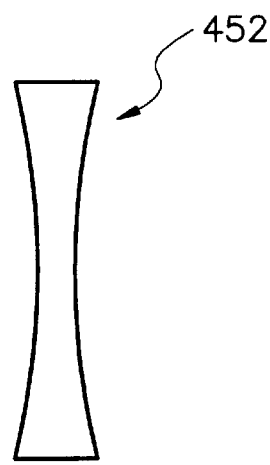
Figure 7D:
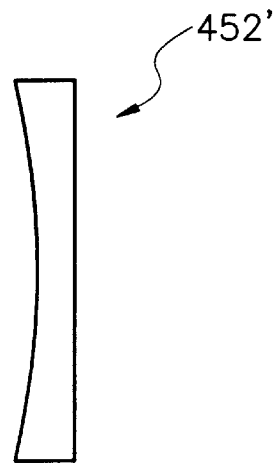

FIG. 7B is a front view and FIG. 7C is a side view of the LCD device 452 having a complexly positive (+) distorted and curved (concave) shape. FIG. 7D is a side view of a modified preferred embodiment of an LCD device 452' having a shape in which a light emitting surface thereof is distorted and curved (concave).

Also, in the existing LCD projection system, when an image formed on the screen S is merely distorted in the direction of positive (+) to be a pin-cushion type image 32 or in the direction of negative (−) to be a barrel type image 33, the distorted images can be corrected by altering the shape of the LCD device to correspond to the distorted shape without changing the curvature of the LCD device.

When the LCD devices 451 and 452 are formed to be distorted and/or curved in the negative (−) direction or in the positive (+) direction as shown in FIGS. 6A through 6D and FIGS. 7A through 7D, the LCD devices 451 and 452 applied to an LCD projection system according to the present invention may be formed in various types, as described below, according to the size of an effective screen, the optical configuration of a projection lens unit, and the magnification power of an image.

Figure 8A:
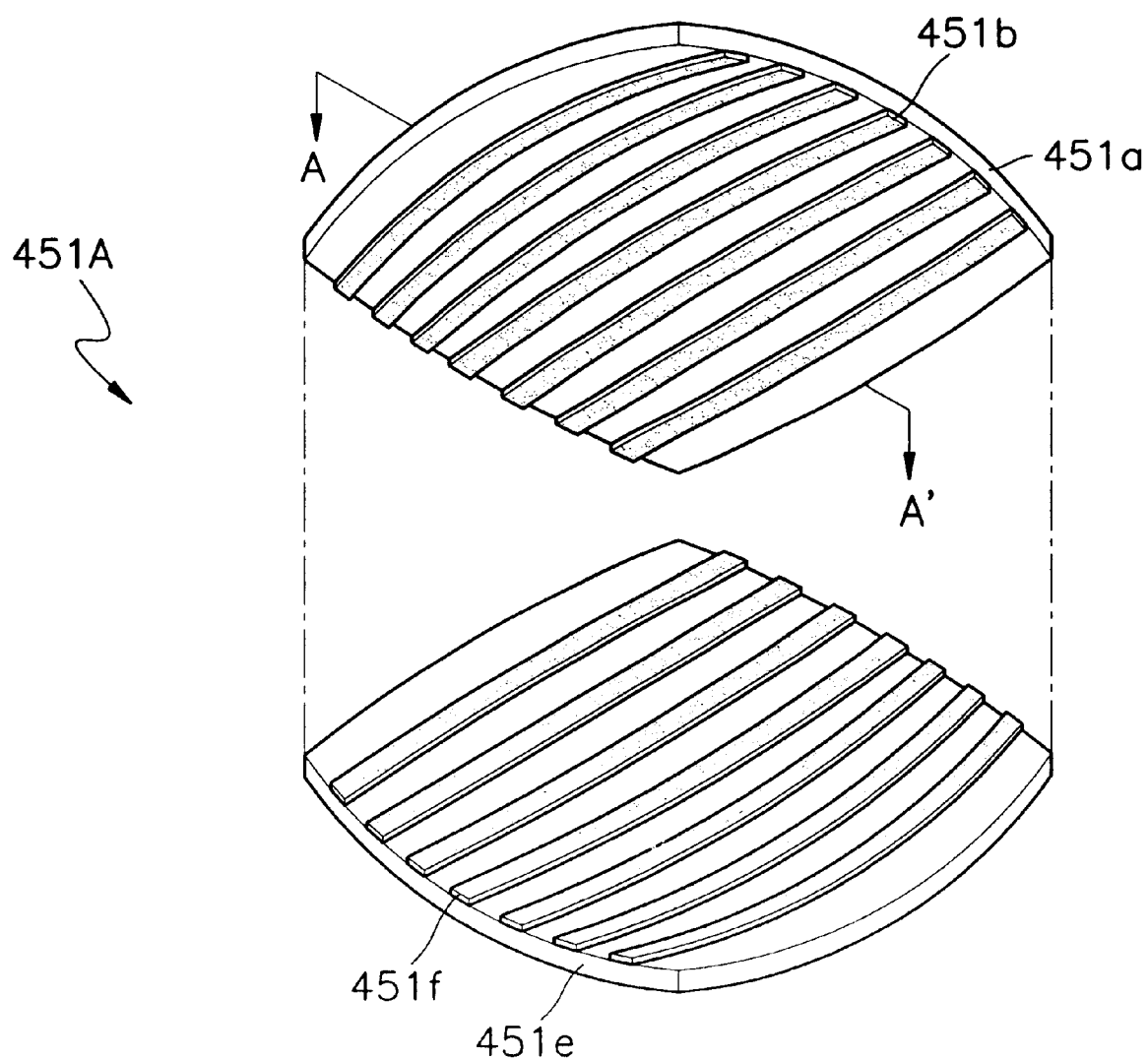
FIGS. 8A and 8B are views showing the types of embodiments of an LCD device having the shape and structure which are applied to negative (−) distortion and curvature shape in combination in an LCD projection system according to the present invention.
Figure 8B:
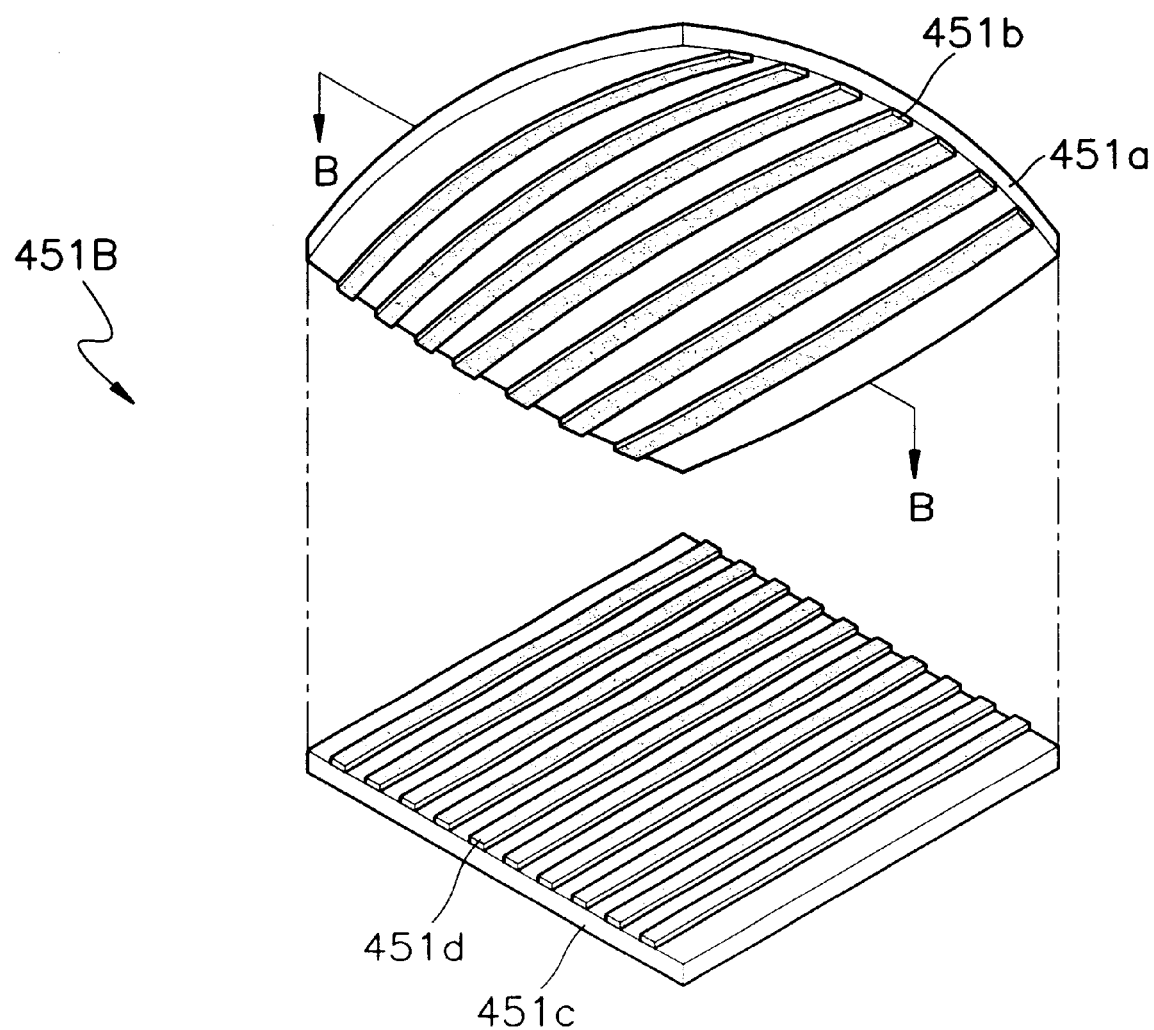

For example, as shown in FIGS. 6A through 6D, in the case of the LCD device 451 distorted and/or curved to be a barrel type in the negative (−) direction, LCD devices 451A and 451B which are distorted and curved as shown in FIGS. 8A and 8B are selected.

That is, in the case of the LCD device 451A shown in FIG. 8A, a front substrate 451a and a rear substrate 451e are distorted and curved negatively (−) to be a barrel type, and simultaneously, scanning electrodes 451b and signal electrodes 452f formed on the front substrate 451a and the rear substrate 451e to be perpendicular to each other, respectively, are formed to be distorted and curved negatively (−) from the center thereof to the outside.

In the case of the LCD device 451B shown in FIG. 8B, the front substrate 451a forming a light emitting surface is formed to be distorted and/or curved negatively (−) to be a barrel type, and simultaneously, the scanning electrode 451b formed on the rear side of the front substrate 451a is formed to be gradually distorted and/or curved negatively (−) from the center thereof to the outside.

In this case, the rear substrate 451c is formed to be a typical flat panel type. A signal electrode 451d, formed on the rear substrate 451c, may be formed in a typical stripe pattern and may have a distorted and curved pattern corresponding to the scanning electrodes 451b.

According to the above electrode pattern, pixels of the LCD devices 451A and 451B are arranged in a curved pattern, and also the size of each pixel is distorted and curved to be proportionally decreased from the center of an effective screen to the outside as shown in FIGS. 6A and 6B.

Although not shown in the drawings, the rear substrate corresponding to the LCD device 451B shown in FIG. 8B has a barrel shape distorted and/or curved negatively (−), and a flat panel type LCD device may be adopted as the front substrate.

An LCD device of each of the above-mentioned various types can be selectively adopted according to the size of an effective screen, the optical configuration and magnifying power of the projection lens unit, and the type or specification of the LCD projection system.

Figure 9A:
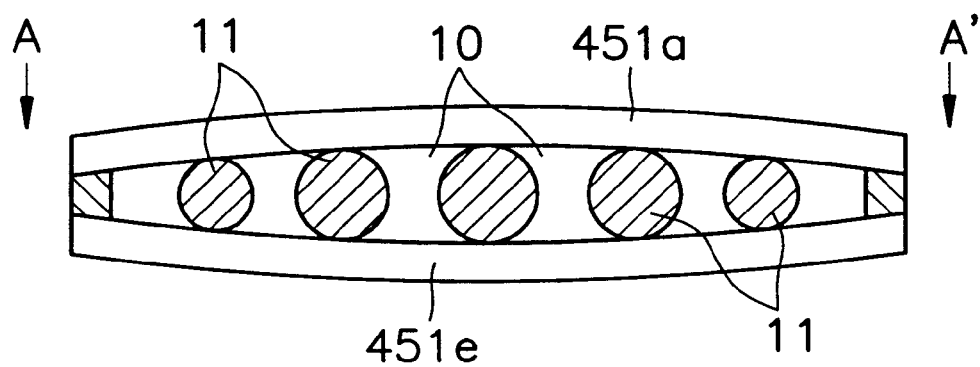
FIGS. 9A and 9B are sectional views taken along line 9A–9A' of FIG. 8A and line 9B–9B' of FIG. 8B, respectively.
Figure 9B:
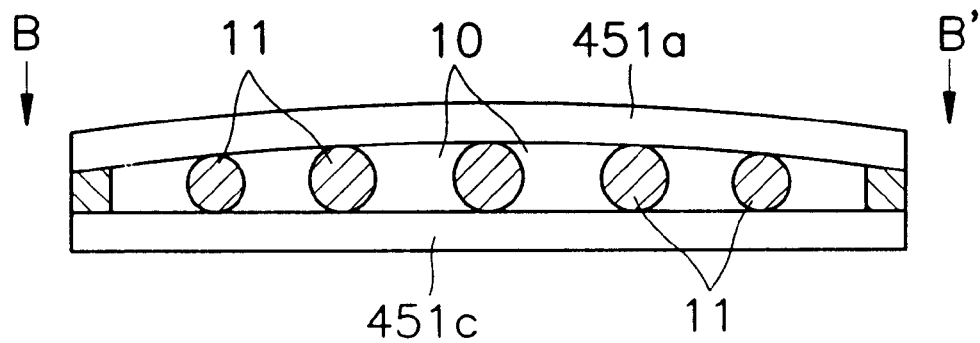

In the case of a distorted and/or curved shape, such as the LCD devices 451A and 451B, to maintain the shape in a stable state, a plurality of spacers 11 inserted in liquid crystal 10 filled between the front substrate 451a and the rear substrate 451c (451e), as shown in FIGS. 9A and 9B, are formed such that the diameter of the spacer 11 decreases proportionally from the center of an effective screen to the outside.

Figure 10A:
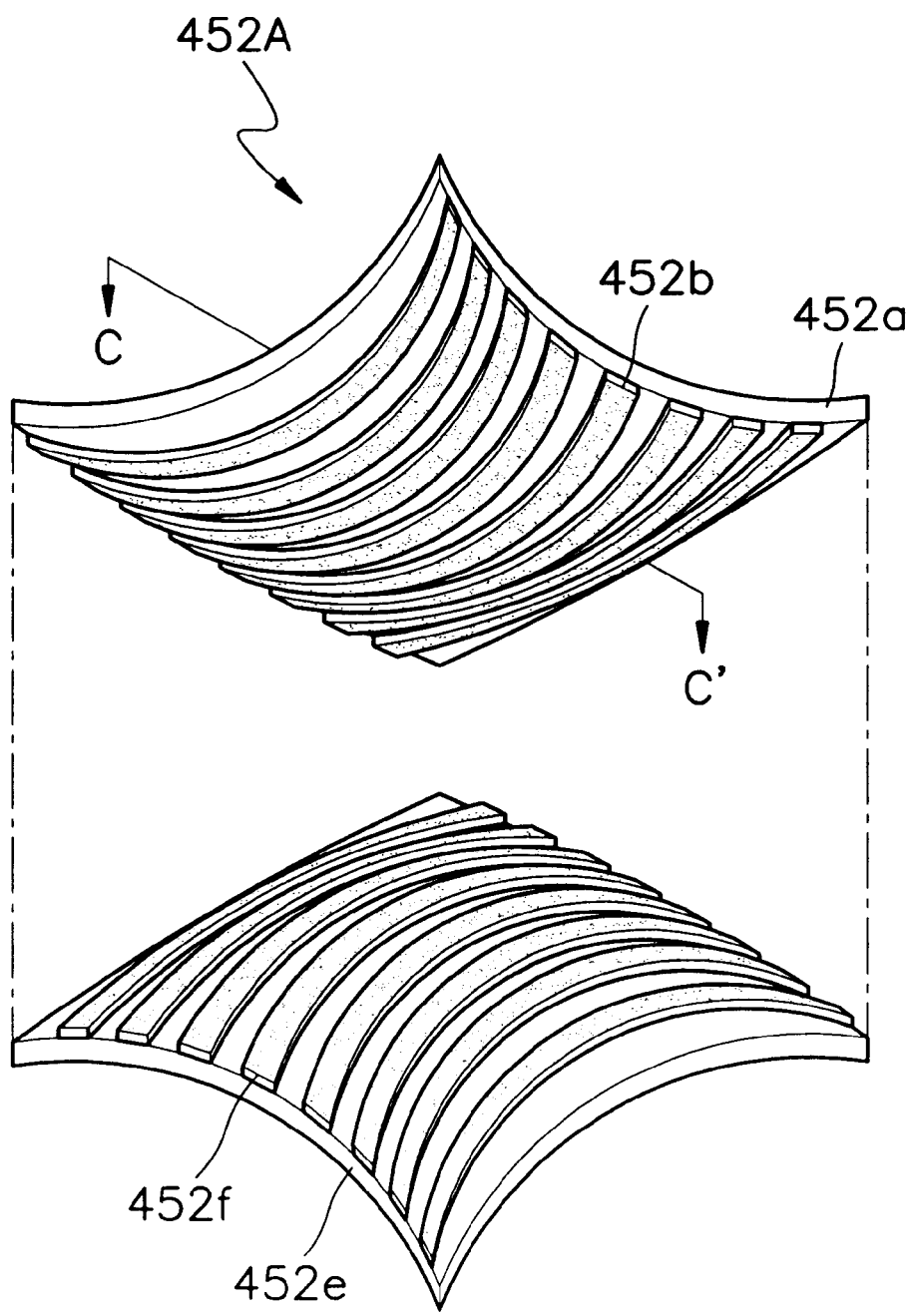
FIGS. 10A and 10B are views showing the types of embodiments of an LCD device having the shape and structure which are applied to positive (+) distortion and curvature shape in combination in an LCD projection system according to the present invention.
Figure 10B:
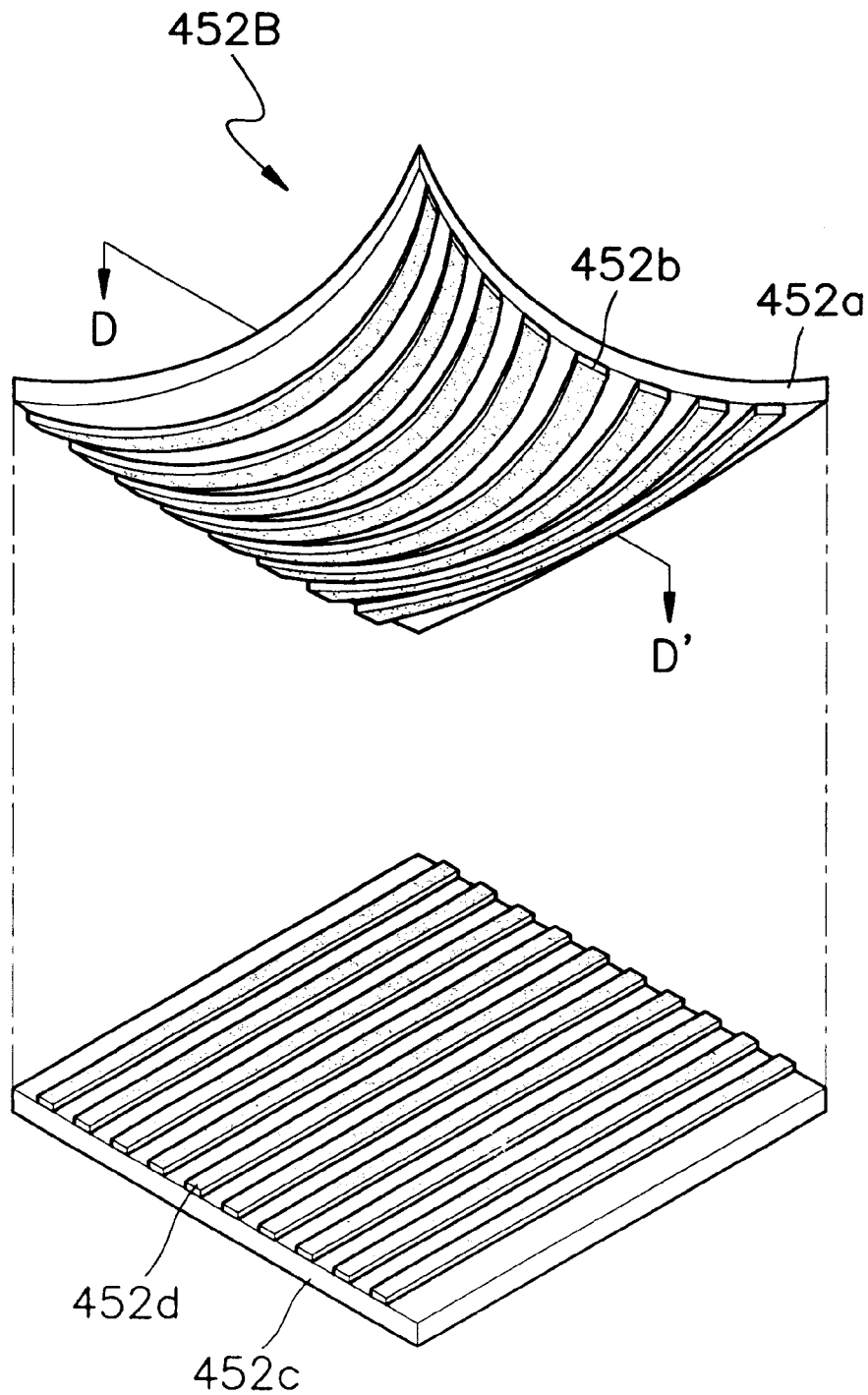

In the case of the LCD device 452 formed to be distorted as a pin-cushion type as shown in FIGS. 7A through 7D, the type of the LCD devices 452A and 452B as shown in FIGS. 10A and 10B is selected to be distorted and/or curved.

In the case of the LCD device 452A as shown in FIG. 10A, the front substrate 452a and the rear substrate 452e are distorted and curved in complementary pincushion shapes, and simultaneously the scanning electrode 452b and the signal electrode 452f, respectively formed on the front substrate 452a and the rear substrate 452e to be perpendicular to each other can be formed in a pattern such that they are gradually distorted and curved positively (+) from the center thereof to the outside.

The type of the LCD device 452B as shown in FIG. 10B may be adopted. In the case of the LCD device 452B, the front substrate 452a forming a light emitting surface is distorted and curved positively to be a pin-cushion type, and simultaneously, the scanning electrode 452b formed at the rear surface of the front substrate 452a can be formed to be gradually distorted and curved positively from the center thereof to the outside to be a pin-cushion type.

In this case, the rear substrate 452c is formed to be a typical flat panel type and the signal electrode 452d formed on the rear substrate 452c can be formed in a typical strips pattern, or can also have a pattern to be distorted and curved (not shown) corresponding to the scanning electrode 452b.

Although not shown in the drawings, a rear substrate can have a shape of a pin-cushion type to be distorted and/or curved positively (+), which corresponds to the front substrate of the LCD device 452B as shown in FIG. 10B, and a flat panel type LCD device can be adopted as a front substrate.

The above-mentioned LCD devices of various types can be selectively adopted according to the size of an effective screen, the optical configuration of the projection lens unit, the magnification of an image, and the type or specification of an LCD projection system.

Figure 11A:
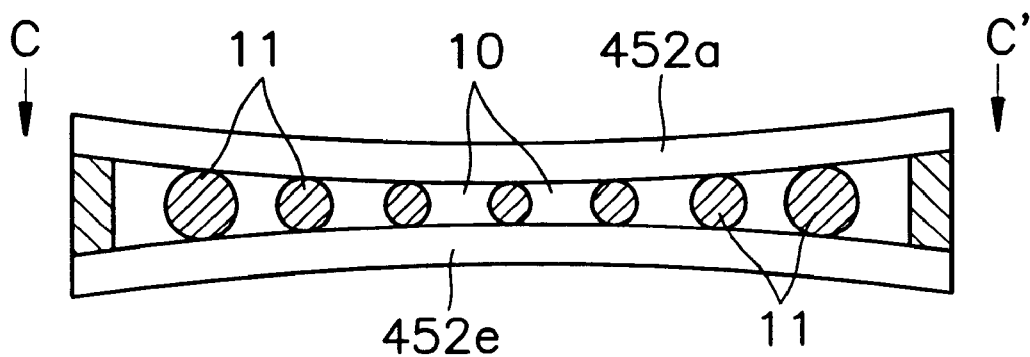
FIGS. 11A and 11B are sectional views taken along line 11C–11C' of FIG. 10A and line 11D–11D' of FIG. 10B, respectively.
Figure 11B:
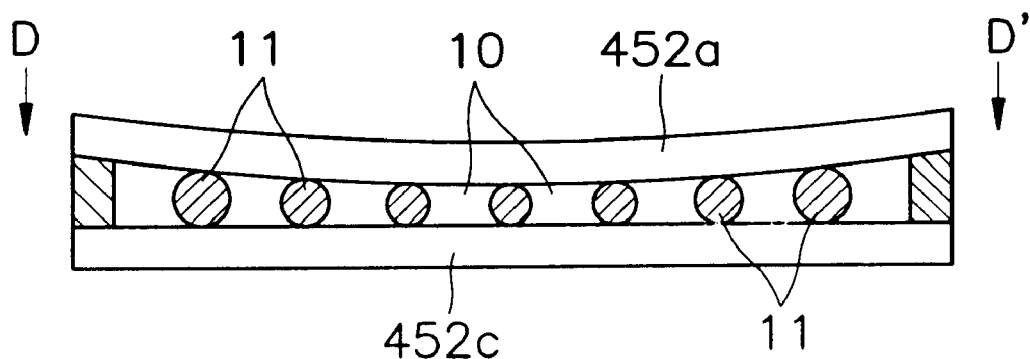

In the case of the distorted and/or curved structure, such as the LCD devices 452A and 452B, to maintain the shape and structure in a stable state, it is preferred that a plurality of spacers 11 are inserted in liquid crystal 10 filled between the front substrate 452a and the rear substrates 452c and 452e, as shown in FIGS. 11A and 11B, and the diameter of the spacers 11 proportionally increases from the center of an effective screen to the outside.

According to the present invention, the substrates 451a, 451e, 452a and 452e of the LCD devices 451A, 451B, 452A and 452B having the above-described shapes and structures may be manufactured, for example, using a mold which is manufactured by a three-dimensional design to have a desired shape of distortion and curvature, or manufactured by a processing method using a cop machine.

The distorted and/or curved patterns of the electrodes 451b, 451d, 451f, 452b, 452d and 452f can be formed to correspond to the distorted and/or curved shapes of the above substrates using a deposition method such as a typical photolithographic process or chemical vapor deposition (CVD).

The above preferred embodiments are for the cases applied to a reflection type LCD projection system. The technical concept in the present invention is of course applied to a transmission type LCD projection system as it is. Furthermore, it can be applied to a single panel type LCD projection system or a three panel type LCD projection system. That is, the LCD device according to each of the above preferred embodiments can be adopted as either a reflection type LCD projection system or transmission type LCD projection system. In particular, the present invention can be useful for an image display device, such as a projection TV.

As described above, according to an LCD projection system according to the present invention, distortion aberration and/or curvature aberration of a projection lens unit can be corrected in a state in which other optical lens aberrations such as chromatism is corrected by forming an LCD device to be distorted and/or curved so that a light emitting point of an image generating source is changed corresponding to the distorted and/or curved shape of an image formed on a screen before correction, and not by adding or removing optical lenses. Thus, the distortion aberration and/or curvature aberration is fundamentally corrected and performance of image formation is drastically improved.

What is claimed is:

1. A liquid crystal display (LCD) projection system including a light source for generating and emitting light, an LCD device for generating image light using incident light emitted from the light source, and a projection lens unit for magnifying and projecting the image light emitted from the LCD device onto a screen, wherein the LCD device has at least one of a distorted shape and a curved shape corresponding to an image formed on the screen before correcting for at least one of distortion and curvature of the image formed on the screen, which is generated due to at least one of distortion aberration and curvature aberration of the projection lens unit, so that at least one of distortion and curvature is corrected.

2. The LCD projection system as claimed in claim 1, wherein the LCD device has a pin-cushion type structure distorted and curved positively (+) so that negative (−) distortion and curvature of the image formed on the screen, which is generated due to distortion aberration and curvature aberration of the projection lens unit, is corrected.

3. The LCD projection system as claimed in claim 2, wherein the LCD device comprises a front substrate and a rear substrate, each having electrodes formed thereon, and at least one of the front substrate and the rear substrate has a pin-cushion shape which is at least one of distorted and curved positively (+).

4. The LCD projection system as claimed in claim 3, wherein the electrodes formed on each of the front substrate and the rear substrate are formed in patterns according to the distorted and curved shapes of the front and rear substrates so that pixels are arranged in a curved pattern.

5. The LCD projection system as claimed in claim 3, wherein, in the LCD device, the size of each pixel proportionally increases from the center of an effective screen to the outside.

6. The LCD projection system as claimed in claim 3, wherein, in the LCD device, the diameter of spacers inserted between the front substrate and the rear substrate proportionally increases from the center of an effective screen to the outside.

7. The LCD projection system as claimed in claim 1, wherein the LCD device has a pin-cushion shape distorted positively (+) so that negative (−) distortion of an image formed on the screen, which is generated due to distortion aberration of the projection lens unit, is corrected.

8. The LCD projection system as claimed in 7, wherein the LCD device comprises a front substrate and a rear substrate, each having electrodes formed thereon, and at least one of the front substrate and the rear substrate has a pin-cushion shape distorted positively (+).

9. The LCD projection system as claimed in claim 8, wherein the electrodes formed on each of the front substrate and the rear substrate are formed in patterns according to the distorted shapes of the front and rear substrates so that pixels are arranged in a curved pattern.

10. The LCD projection system as claimed in claim 8, wherein, in the LCD device, the size of each pixel proportionally increases from the center of an effective screen to an outside.

11. The LCD projection system as claimed in claim 8, wherein, in the LCD device, the diameter of spacers inserted between the front substrate and the rear substrate proportionally increases from the center of an effective screen to an outside.

12. The LCD projection system as claimed in claim 1, wherein the LCD device has a barrel shape distorted negatively (−) so that positive (+) distortion of an image formed on the screen, which is generated due to distortion aberration of the projection lens unit, is corrected.

13. The LCD projection system as claimed in claim 12, wherein the LCD device comprises a front substrate and a rear substrate, each having electrodes formed thereon, and at least one of the front substrate and the rear substrate has a barrel shape distorted negatively (−).

14. The LCD projection system as claimed in claim 13, wherein the electrodes formed on each of the front substrate and the rear substrate are formed in patterns according to the distorted shapes of the front and rear substrates so that pixels are arranged in a curved pattern.

15. The LCD projection system as claimed in claim 13, wherein, in the LCD device, the size of each pixel proportionally decreases from the center of an effective screen to an outside.

16. The LCD projection system as claimed in claim 13, wherein, in the LCD device, the diameter of spacers inserted between the front substrate and the rear substrate proportionally decreases from the center of an effective screen to an outside.

* * * * *